United States Patent
Hernette et al.

(10) Patent No.: US 9,649,905 B2
(45) Date of Patent: May 16, 2017

(54) SHOCK ABSORBER

(71) Applicants: PEUGEOT CITROEN AUTOMOBILES SA, Vélizy-Villacoublay (FR); KAYABA INDUSTRY CO., LTD., Tokyo (JP)

(72) Inventors: Vincent Hernette, Paris (FR); Javier Lizarraga, Pamplona (ES)

(73) Assignee: KYB Corporation, Tokyo (JP)

( * ) Notice: Subject to any disclaimer, the term of this patent is extended or adjusted under 35 U.S.C. 154(b) by 92 days.

(21) Appl. No.: 14/769,153

(22) PCT Filed: Feb. 20, 2014

(86) PCT No.: PCT/JP2014/054035
§ 371 (c)(1),
(2) Date: Oct. 16, 2015

(87) PCT Pub. No.: WO2014/129543
PCT Pub. Date: Aug. 28, 2014

(65) Prior Publication Data
US 2016/0031282 A1 Feb. 4, 2016

(30) Foreign Application Priority Data
Feb. 20, 2013 (FR) .................................. 13 51430

(51) Int. Cl.
*B60G 15/06* (2006.01)
*B60G 15/07* (2006.01)
(Continued)

(52) U.S. Cl.
CPC ......... *B60G 15/063* (2013.01); *B60G 13/005* (2013.01); *B60G 13/008* (2013.01);
(Continued)

(58) Field of Classification Search
CPC .... B60G 15/06; B60G 15/062; B60G 15/063; B60G 15/067; B60G 15/068; B60G 15/07;
(Continued)

(56) References Cited

U.S. PATENT DOCUMENTS 6,199,845 B1 * 3/2001 Rispeter ............... B60G 15/063
267/221
8,910,759 B2 * 12/2014 Marquar ................ B60G 15/07
188/251 A
(Continued)

FOREIGN PATENT DOCUMENTS

DE  EP 0027163 A1 * 4/1981 ............... F16F 9/38
JP  S59-91990 U  6/1984
(Continued)

*Primary Examiner* — Barry Gooden, Jr.
(74) *Attorney, Agent, or Firm* — Rabin & Berdo, P.C.

(57) ABSTRACT

A shock absorber mounted on a vehicle includes an inner portion that is made of a metal and has a first upper end and a first lower end, and an outer portion that is made of a composite material and is integrally formed with the inner portion. The outer portion has at least one of a second upper end on which the first upper end of the inner portion is folded and a second lower end on which the first lower end of the inner portion is folded, and a middle portion that has a seat for supporting a suspension spring.

13 Claims, 4 Drawing Sheets

(51) Int. Cl.
*B60G 13/00* (2006.01)
*F16F 9/54* (2006.01)
*F16F 13/00* (2006.01)

(52) U.S. Cl.
CPC ............... *B60G 15/07* (2013.01); *F16F 9/54* (2013.01); *F16F 13/007* (2013.01); *B60G 2202/312* (2013.01); *B60G 2206/41* (2013.01); *B60G 2206/7101* (2013.01); *B60G 2206/72* (2013.01)

(58) Field of Classification Search
CPC ..... B60G 13/005; B60G 13/008; F16F 7/108; F16F 7/124; F16F 9/2307; F16F 9/3235
See application file for complete search history.

(56) References Cited

U.S. PATENT DOCUMENTS

| | | | |
|---|---|---|---|
| 2002/0135213 A1 | 9/2002 | Fullenkamp et al. | |
| 2004/0041063 A1* | 3/2004 | Enders | A47C 3/30 248/161 |
| 2005/0218574 A1 | 10/2005 | Nishimura | |
| 2011/0056785 A1* | 3/2011 | Marquar | B60G 15/07 188/322.19 |
| 2016/0137017 A1* | 5/2016 | Wilkin | B60G 15/063 267/221 |

FOREIGN PATENT DOCUMENTS

| | | |
|---|---|---|
| JP | H11-294512 A | 10/1999 |
| JP | 2003-269522 A | 9/2003 |
| JP | 2008-025695 A | 2/2008 |
| KR | 10-2007-0062700 A | 6/2007 |

* cited by examiner ized the strut.

SHOCK ABSORBER

TECHNICAL FIELD

The present invention relates to a shock absorber.

BACKGROUND ART

As known in the art, a certain shock absorber of a vehicle has a strut. One side of the strut is connected to a knuckle arm of one wheel of a front axle of a vehicle, and the other side is connected to a piston rod assembly combined with a chassis of the vehicle.

The strut has a seat in its upper part. The seat serves as a support surface for supporting a lower winding end of a suspension spring that internally houses the piston rod assembly. Therefore, the strut supports a front part of a vehicle along with the suspension spring. In addition, the strut is rotated with respect to an axial line of the shock absorber so as to allow for wheel steering. In particular, the strut is subjected to a strong mechanical action when a vehicle is in a braking operation, an acceleration operation, and a turning operation. For this reason, stiffness of the strut affects controllability of the wheel surface, so that a vehicle behavior on a road surface depends on this controllability.

The strut is required to be tolerable to various stresses in three spatial directions (e.g., vertical, horizontal, and longitudinal directions). Therefore, in general, the strut is manufactured in a monoblock manner and is formed of a metal material such as steel.

SUMMARY OF INVENTION

The use of the metal material is disadvantageous in terms of a weight, that is, energy consumption. This is against the current maker's trend for reducing pollution generated from an exhaust of a heat engine. However, it is very difficult to reduce a weight of the strut while physical characteristics such as a mechanical strength and stiffness are maintained.

It is an object of the present invention to address such problems.

According to one aspect of the present invention, a shock absorber mounted on a vehicle includes an inner portion that is made of a metal and has a first upper end and a first lower end, and an outer portion that is made of a composite material and is integrally formed with the inner portion. The outer portion has at least one of a second upper end on which the first upper end of the inner portion is folded and a second lower end on which the first lower end of the inner portion is folded, and a middle portion that has a seat for supporting a suspension spring.

Additional features and characteristics of this the present invention will become more apparent from the following detailed description considered with the reference to the accompanying drawings. Note that the drawings were created using computer-aid design software CAO/DAO, and thus, some lines may be discontinuous intentionally.

DESCRIPTION OF EMBODIMENTS

A description will now be made for an embodiment of the present invention with reference to the accompanying drawings.

The following description relates to a case where a shock absorber D according to the embodiment of the present invention is included in a part of a front axle of a vehicle.

The front axle is included in a part of a motor-based vehicle such as an automobile. However, the present invention is not limited to such a type of vehicles, but may be applied to overall types of land vehicles having at least one front axle for steering including right and left wheels.

Figure 1:
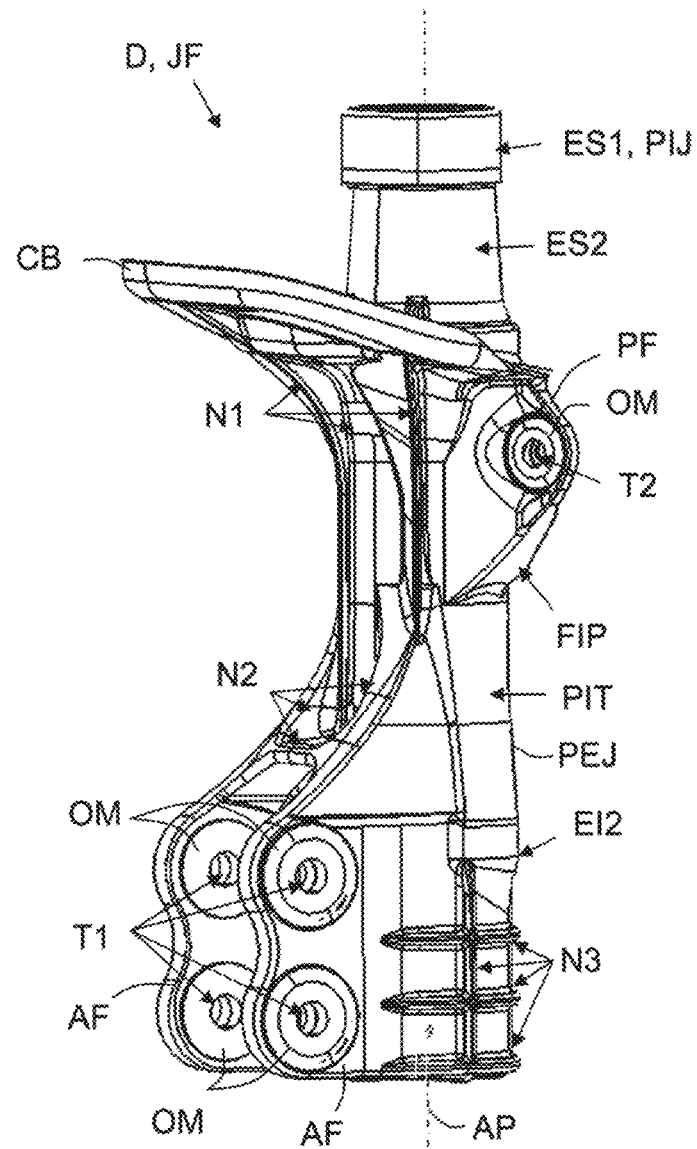
FIG. 1 is a schematic perspective view illustrating a strut of a shock absorber according to an embodiment of the present invention.

As illustrated in FIG. 1 in part, the shock absorber D has a strut JF combined with a piston rod assembly and a coil spring of a suspension. The piston rod assembly has an upper part combined with a chassis of a vehicle and a lower part combined with an upper side ES1 and ES2 of the strut JF. In addition, the piston rod assembly is housed in an inner area of a cavity defined by winding of the suspension spring.

Figure 2:
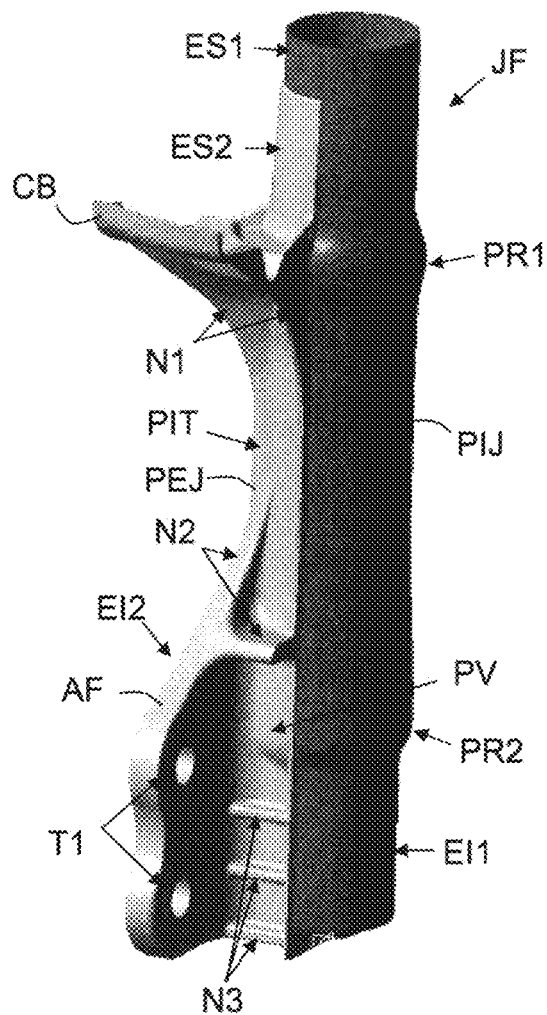
FIG. 2 is a schematic vertical cross-sectional view illustrating a strut before a first upper end of an inner portion is bent toward a second upper end of an outer portion.

As illustrated in FIGS. 1 and 2, the strut JF has a metal inner portion PIJ and an outer portion PEJ integrally formed across nearly the entire length of the inner portion PIJ. The outer portion PEJ is integrally formed with the inner portion PIJ such that they are closely spaced with each other.

The inner portion PIJ is formed of a metal material extraordinarily tolerable to, in particular, a pressure, a tensile force, or distortion, such as steel or aluminum. The inner portion PIJ has a first upper end ES1 and a first lower end El1. The metal material is subjected to harsh stresses such as tension, compression, and bending. In addition, the metal material is also subjected to distortion although it is weaker. Therefore, a very strong material is used as the metal material. As a result, it is possible to reduce a thickness and mass of the inner portion PIJ.

Figure 3:
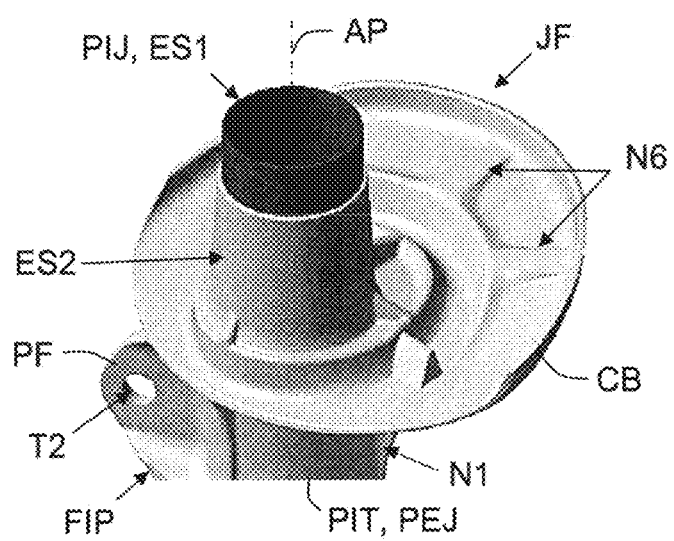
FIG. 3 is a schematic perspective view illustrating a strut as seen from the top before the first upper end of the inner portion is bent toward the second upper end of the outer portion.

As illustrated in FIGS. 2 and 3, the inner portion PIJ has a generally cylindrical shape centered at the axial line AP. However, this shape is not essential, and the inner portion PIJ may not be a body of rotation having an axis. However, such a shape is advantageous because it can simplify an industrial manufacturing method and maximize bending resistance in portions where the harshest external force is applied.

As illustrated in FIG. 2, the inner portion PIJ advantageously has a first protrusion (or swelling portion) PR1 underlying the first upper end ES1 and a second protrusion (or swelling portion) PR2 overlying the first lower end El1. As a result, it is possible to improve engagement between the outer portion PEJ and the inner portion PIJ along the axial line AP (in terms of coherence).

The first and second protrusions PR1 and PR2 are preferably thicker than the other portions of a wall that defines the inner portion PIJ.

Each of the first and second protrusions PR1 and PR2 has a substantially annular shape. Alternatively, the first and second protrusions PR1 and PR2 may have slightly geometrical and complicated shapes. Alternatively, the first and second protrusions PR1 and PR2 may have a simpler structure. For example, the apexes (outermost diameter portion) of the protrusions PR1 and PR2 may be combined using a single cylindrical portion. In this case, a pair of swelling portions is combined into a single cylindrical swelling portion, and a thick portion formed of a composite material is provided in the edge of the single cylindrical swelling portion.

As illustrated in FIG. 2, the inner portion PIJ is formed by changing an area of the transversal cross section between the first and second protrusions PR1 and PR2. As a result, it is possible to further improve engagement between the outer portion PEJ and the inner portion PIJ along the axial line AP (in terms of coherence). In addition, by enlarging an outer diameter in a position of the first lower end El1 (in the vicinity of the portion connected to the knuckle arm), it is possible to improve bending resistance (bending strength).

Figure 4:
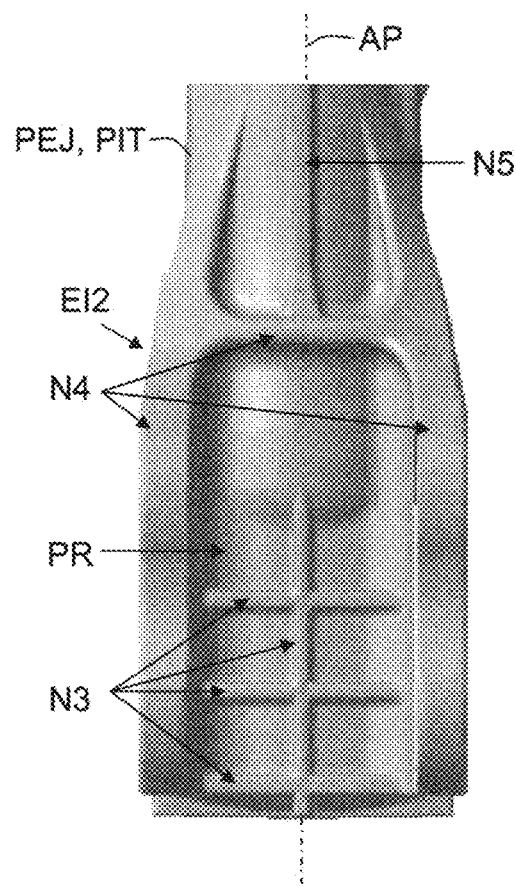
FIG. 4 is a schematic rear view illustrating a second lower end of the outer portion of the strut as seen from the rear side.

The outer portion PEJ is formed integrally with the inner portion PIJ at least except for the first upper end ES1 of the inner portion PIJ. The outer portion PEJ is formed of, for example, a very strong composite material such as a combination of glass fiber (as necessary, unoriented fibers having a length of 25 mm) and thermosetting vinyl ester or polyester resin, or a combination of carbon fiber and epoxy resin. In addition, as illustrated in FIGS. 1 and 4, the outer portion PEJ has a second upper end ES2, a middle portion PIT, and a second lower end El2.

According to this embodiment, the integral formation of the composite material is performed continuously between the upper and lower parts of the inner portion PIJ. Alternatively, the composite material may be integrally formed in the inner portion PIJ such that the composite material is divided into upper and lower sides at least in part by exposing the middle portion of the inner portion PIJ (where nearly no external force is applied).

As illustrated in FIG. 1, the first upper end ES1 of the inner portion PIJ is deformed and folded on a part of the second upper end ES2 of the outer portion PEJ. After the first upper end ES1 is folded, a flange space (in this case, cylindrical shape) capable of improving engagement between the inner and outer portions PIJ and PEJ (in terms of coherence) is defined in the edge of the strut JF along the axial line AP. Instead of folding the first upper end ES1 on the second upper end ES2, the first lower end El1 may be folded on the second lower end El2. Alternatively, both the first upper end ES1 and the first lower end El1 may be folded on the second upper end ES2 and the second lower end El2, respectively.

The middle portion PIT has a (lower) seat CB that defines a support surface for supporting the lower winding end of the suspension spring directly under the second upper end ES2. The seat CB is decentered toward the front side PV of the outer portion PEJ. The seat CB has a very thick center reinforcing area around the inner portion PIJ for transferring a stress of the winding of the suspension spring. In addition, the seat CB has a separate thin area, so called a safety area, in its periphery in order to prevent a hole from being opened in a tire when the suspension spring is broken.

The second lower end El2 of the outer portion PEJ surrounds the first lower end El1 of the inner portion PIJ. In addition, the second lower end El2 has a pair of brackets AF nearly parallel to each other and connectable to the knuckle arm of the front axle. The knuckle arm is a main component of the front axle for installing most of the components. The knuckle arm has a wheel hub in its center to support a brake caliper. An A-shaped arm (triangle) is connected to a base portion of the knuckle arm by using a ball bearing. In addition, the knuckle arm has a horizontal arm connected to a steering link. Furthermore, the strut JF is connected to the upper side of the knuckle arm. According to this embodiment, the knuckle arm is interposed by a pinching portion of the strut (a pair of brackets AF). A pair of brackets AF is a member called a pinching portion for installing the knuckle arm as known in the art. The brackets AF are not limited to a pair of brackets parallel to each other as illustrated in the drawings.

The knuckle arm has an installation portion arranged between a pair of brackets AF to engage both the brackets with each other. Preferably, the installation portion is very thick (having at least a thickness of 40 mm or thicker). As illustrated in the drawings, the engagement between the knuckle arm and the brackets AF is performed using a pair of holes T1 provided in each bracket AF, a pair of holes provided in the installation portion of the knuckle arm to match the holes T1 of the brackets AF, and a pair of screws inserted into the holes T1 of the brackets AF and the holes of the installation portion of the knuckle arm.

As illustrated in FIG. 1, a ring (or an insert) formed of, for example, metal such as steel is preferably installed to the holes T1 of the brackets AF. That is, a metal ring having a hole where a screw can be inserted is preferably installed to the hole T1 of the bracket AF. As a result, it is possible to improve a fastening force of the screw and set the support force of the screw to a predetermined value or nearly the predetermined value. Such an insert has a unique shape for guaranteeing a support force of the screw in screw engagement between steel and the composite material. This unique shape may be provided to have preliminary resilience.

In order to improve a strength of the outer portion PEJ, the outer portion PEJ may have a single or a plurality of stiffening ribs (or reinforcing ribs).

As illustrated in FIG. 1, the outer portion PEJ has, for example, a first stiffening rib N1 in the middle portion PIT. The first stiffening rib N1 is combined with a lower surface of the seat CB and is defined on a surface including the axial line AP, so that a load capacity of the seat CB against the pressure applied by the suspension spring increases. According to this embodiment, as illustrated in FIG. 1, the middle portion PIT has three first stiffening ribs N1 offset from each other in an angular sense.

A description will now be made of modifications of the aforementioned embodiment.

As illustrated in FIGS. 1 and 2, the outer portion PEJ has a second stiffening rib N2, for example, in the middle portion PIT. The second stiffening rib N2 serves as an upward extension of the bracket AF and is combined with upper sides of each bracket AF. The second stiffening rib N2 may be combined with another horizontally spaced second stiffening rib N2 as illustrated in the drawings.

As illustrated in FIGS. 1 to 3, the second lower end El2 has a third stiffening rib N3 partially combined, for example, in a gap between the brackets AF (the front side PV), in the rear side PR of the bracket AF, and/or on the brackets AF. In the embodiment illustrated in the drawings, the third stiffening rib N3 includes ribs substantially in parallel with the axial line AP and substantially perpendicular to the axial line AP arranged between the brackets AF, in the rear side PR of the brackets AF, and on the brackets. The third stiffening rib N3 serves as a highly stiff reinforcing member in the fitting area of the first lower end El1 of the inner portion PIJ.

As illustrated in FIG. 4, the outer portion PEJ has, for example, a pair of fourth wide stiffening ribs N4 extending along the axial line AP in the rear side PR of the second lower end El2. As illustrated in FIG. 4, the fourth stiffening ribs N4 may be connected to each other by another horizontal fourth stiffening rib N4 narrower than the stiffening ribs extending along the axial line AP as necessary. The fourth stiffening ribs N4 serve as a highly strong and highly stiff reinforcing member in the fitting area of the first lower end El1 of the inner portion PIJ.

As illustrated in FIG. 4, the outer portion PEJ has, for example, at least one fifth stiffening rib N5 extending along the axial line AP in the rear side PR of the middle portion PIT. The fifth stiffening rib N5 may be formed to have a large width.

As illustrated in FIG. 3, the seat CB has a stiffening rib N6 extending in a substantially radial direction.

As illustrated in FIGS. 1 and 3, a fixing portion PF connectable to an anti-roll bar of the front axle is provided in the middle portion PIT of the outer portion PEJ. For engagement between the anti-roll bar and the fixing portion PF, the fixing portion PF has a hole T2 where a screw can be inserted as illustrated in the drawings. As metal ring such as a steel ring (or an insert) OM is preferably installed to the hole T2. That is, it is preferable that a metal ring having a hole where a screw can be inserted be installed to the hole T2 of the fixing portion PF. As a result, it is possible to improve a fastening strength of the screw and set a support force of the screw to a predetermined value or nearly the predetermined value.

As illustrated in FIG. 1, the fixing portion PF preferably has a shape capable of improving a bending strength and a distortion strength. For this purpose, the fixing portion PF is thinned upward and in a radial direction from the middle portion PIT to the hole T2. For example, as illustrated in the drawings, the lower surface FIP of the fixing portion PF is inclined so as to form a generally trapezoidal shape (that is, out of a pair of parallel sides, the longer side is arranged in the middle portion PIT).

The fixing portion PF is provided to be offset from the seat CB in an angular sense depending on the configuration and arrangement of the anti-roll bar. However, this is not essential in this invention. Here, the link rods of the anti-roll bar are substantially perpendicular and are fixed to the strut by using a ball bearing. For this reason, in order to improve reinforcement and obtain the mechanical strength and stiffness in the termination of the ball bearing, the reinforcement has an asymmetrical shape.

The shock absorber D preferably has a metal reinforcing strip surrounding a part of the second lower end El2 of the outer portion PEJ. The reinforcing strip can be combined with the brackets AF by using at least one of a pair of screws inserted into the holes T1 of the brackets AF. The reinforcing strip is formed of, for example, steel to reinforce the installation pinching portion including a pair of brackets AF in a horizontal direction.

The shock absorber D is not limited to a strut type and also does not necessarily have the bracket AF. In this case, the lower end of the shock absorber D is connected to the lower arm by using an installation member.

The description of the aforementioned embodiment has been made by assuming that the shock absorber D is included in a part of the front axle of a vehicle. However, the shock absorber D may be provided in the rear side as well.

According to this embodiment, it is possible to obtain the following effects.

Since the strut has a hybrid type having the inner portion formed of metal and the outer portion formed of the composite material, it is possible to reduce a weight of the strut while physical characteristics such as a mechanical strength and stiffness are maintained.

In addition, it is possible to reduce a weight of the strut of the front axle up to 30 to 40%.

Embodiments of this invention were described above, but the above embodiments are merely examples of applications of this invention, and the technical scope of this invention is not limited to the specific constitutions of the above embodiments.

This application claims priority based on French Patent Application No. 1351430 filed with the France Patent Office on Feb. 20, 2013, the entire contents of which are incorporated into this specification.

The invention claimed is:

1. A shock absorber mounted on a vehicle, comprising:
   an inner portion that is made of a metal and has a first upper end and a first lower end; and
   an outer portion that is made of a composite material and is integrally formed with the inner portion,
   wherein the outer portion has
      at least one of a second upper end on which the first upper end of the inner portion is folded and a second lower end on which the first lower end of the inner portion is folded, and
      a middle portion that has a seat for supporting a suspension spring.

2. The shock absorber according to claim 1, wherein the middle portion has a first stiffening rib combined with a lower surface of the seat.

3. The shock absorber according to claim 1, wherein the inner portion has a first protrusion arranged under the first upper end and a second protrusion arranged over the first lower end.

4. The shock absorber according to claim 3, wherein the inner portion has a substantially cylindrical shape and is formed by changing a cross-sectional area between the first and second protrusions.

5. The shock absorber according to claim 1, wherein the middle portion has a fixing portion that is capable of being combined with an anti-roll bar of the front axle.

6. The shock absorber according to claim 5, wherein a metal ring having a hole where a screw is capable of being inserted is installed in the fixing portion.

7. A front axle for a vehicle, comprising a pair of the shock absorbers according to claim 1.

8. A vehicle having the front axle according to claim 7.

9. The shock absorber according to claim 1, wherein the second lower end of the outer portion has a pair of substantially parallel brackets that is capable of being combined with a steering knuckle arm of a front axle.

10. The shock absorber according to claim 9, wherein the middle portion has a second stiffening rib combined with each of upper portions of the pair of brackets.

11. The shock absorber according to claim 9, wherein the second lower end of the outer portion has a third stiffening rib combined with at least one of a gap between the brackets, a backside of the bracket, and an upper side of the bracket.

12. The shock absorber according to claim 9, wherein a metal ring having a hole where a screw is capable of being inserted is installed in each of the pair of brackets.

13. The shock absorber according to claim 12, further comprising a metal reinforcing member that surrounds a part of the second lower end of the outer portion and is capable of being installed in the bracket using at least one of the screws.

* * * * *